United States Patent [19]

Borgers et al.

[11] Patent Number: 4,831,440
[45] Date of Patent: May 16, 1989

[54] TELEVISION TRANSMISSION SYSTEM USING TRANSFORM CODING

[75] Inventors: Stephanus M. C. Borgers; Egidius A. P. Woudsma Habraken, all of Eindhoven, Netherlands

[73] Assignee: U.S. Philips Corporation, New York, N.Y.

[21] Appl. No.: 172,603

[22] Filed: Mar. 24, 1988

[30] Foreign Application Priority Data

Apr. 10, 1987 [NL] Netherlands ................. 8700843

[51] Int. Cl.[4] ........................................... H04N 7/133
[52] U.S. Cl. ..................................... 358/133; 364/725
[58] Field of Search .................... 358/133, 138, 13; 364/725

[56] References Cited

U.S. PATENT DOCUMENTS

| | | | |
|---|---|---|---|
| 4,293,920 | 10/1981 | Merola | 358/133 |
| 4,398,217 | 8/1983 | Peters | 358/138 |
| 4,405,936 | 9/1983 | Peters | 358/13 |
| 4,449,194 | 5/1984 | Wilhelm | 364/725 |
| 4,491,937 | 1/1985 | Chan | 365/154 |
| 4,554,645 | 11/1985 | Furman | 365/174 |

Primary Examiner—Howard W. Britton
Attorney, Agent, or Firm—Edward W. Goodman

[57] ABSTRACT

A television transmission system for digital picture signals in which each picture is split up into sub-pictures of NxN pixels for the purpose of reducing the bit rate. Each sub-picture is subjected to a two-dimensional discrete cosine transform (DCT) for determining basic picture weighting factors (coefficients) which are converted by adaptive coding into code words of variable length. This two-dimensional DCT is realized by multiplying the pixels of each row of the sub-picture by the NxN DCT matrix (one-dimensional transform). Consequently, an NxN array of product elements is obtained. The transposed version thereof is once more multiplied by the NxN DCT matrix. Such a one-dimensional transform includes three main steps. In a first main step, the pixels of a row are converted in a first iteration step, into N/2 sum elements $u_{1,i}$ and N/2 difference elements $v_{1,i}$. In a subsequent iteration step, the N/2 sum elements $u_{1,i}$ are converted into N/4 further sum elements $u_{2,i}$ and N/4 further difference elements $v_{2,i}$. This process is repeated until only two sum elements are left. The difference elements obtained in each step are used to determine a plurality of auxiliary sum elements in still further iteration steps. The remaining two sum elements, the difference elements and the auxiliary sum elements are each multiplied in the second main step by an associated linear combination of elements of the DCT matrix. Of the sub-products thus obtained, selected one's of those products are added together or are subtracted from each other in the third main step so that the desired product elements are obtained.

4 Claims, 8 Drawing Sheets

FIG.3

$$\begin{pmatrix}
0.177 & 0.245 & 0.231 & 0.208 & 0.177 & 0.139 & 0.096 & 0.049 \\
0.177 & 0.208 & 0.096 & -0.049 & -0.177 & -0.245 & -0.231 & -0.139 \\
0.177 & 0.139 & -0.096 & -0.245 & -0.177 & 0.049 & 0.231 & 0.208 \\
0.177 & 0.049 & -0.231 & -0.139 & 0.177 & 0.208 & -0.096 & -0.245 \\
0.177 & -0.049 & -0.231 & 0.139 & 0.177 & -0.208 & -0.096 & 0.245 \\
0.177 & -0.139 & -0.096 & 0.245 & -0.177 & -0.049 & 0.231 & -0.208 \\
0.177 & -0.208 & 0.096 & 0.049 & -0.177 & 0.245 & -0.231 & 0.139 \\
0.177 & -0.245 & 0.231 & -0.208 & 0.177 & -0.139 & 0.096 & -0.049
\end{pmatrix}$$

$$P_0 = C_{16}^4\left[(d_0+d_7)+(d_3+d_4)\right]+C_{16}^4\left[(d_1+d_6)+(d_2+d_5)\right]$$

$$P_4 = C_{16}^4\left[(d_0+d_7)+(d_3+d_4)\right]-C_{16}^4\left[(d_1+d_6)+(d_2+d_5)\right]$$

$$P_2 = (C_{16}^2-C_{16}^6)\left[(d_0+d_7)-(d_3+d_4)\right]+$$
$$+C_{16}^6\left[(d_1+d_6)-(d_2+d_5)+(d_0+d_7)-(d_3+d_4)\right]$$

$$P_6 = C_{16}^2\left[(d_1+d_6)-(d_2+d_5)+(d_0+d_7)-(d_3+d_4)\right]+$$
$$+(-C_{16}^2-C_{16}^6)\left[(d_1+d_6)-(d_2+d_5)\right]$$

$$P_1 = (C_{16}^1-C_{16}^7)(d_0-d_7)+(C_{16}^7-C_{16}^3)\left[(d_3-d_4)+(d_0-d_7)\right]+$$
$$+C_{16}^3\left[(d_3-d_4)+(d_2-d_5)+(d_1-d_6)+(d_0-d_7)\right]+$$
$$+(C_{16}^5-C_{16}^3)(d_2-d_5)$$

$$P_3 = C_{16}^3\left[(d_3-d_4)+(d_2-d_5)+(d_1-d_6)+(d_0-d_7)\right]+$$
$$+(-C_{16}^5-C_{16}^3)(d_3-d_4)+(-C_{16}^7+C_{16}^1)(d_1-d_6)+$$
$$+(-C_{16}^1-C_{16}^3)\left[(d_2-d_5)+(d_1-d_6)\right]$$

$$P_5 = (C_{16}^5-C_{16}^3)(d_0-d_7)+$$
$$+C_{16}^5\left[(d_3-d_4)+(d_2-d_5)+(d_1-d_6)+(d_0-d_7)\right]+$$
$$+(-C_{16}^1-C_{16}^3)\left[(d_2-d_5)+(d_1-d_6)\right]+(C_{16}^7+C_{16}^1)(d_2-d_5)$$

$$P_7 = (C_{16}^7-C_{16}^3)\left[(d_3-d_4)+(d_0-d_7)\right]+(-C_{16}^1-C_{16}^7)(d_3-d_4)+$$
$$+(-C_{16}^5-C_{16}^3)(d_1-d_6)+$$
$$+C_{16}^3\left[(d_3-d_4)+(d_2-d_5)+(d_1-d_6)+(d_0-d_7)\right]$$

FIG.6

TELEVISION TRANSMISSION SYSTEM USING TRANSFORM CODING

A. BACKGROUND OF THE INVENTION

A(1) Field of the Invention

The invention generally relates to a television system for the transmission of a digital picture signal from an encoding station to a decoding station via a transmission medium.

More particularly, the invention relates to a television system the encoding station of which is provided with a transform circuit which, for the purpose of realizing a two-dimensional forward discrete cosine transform, is adapted to successively perform two one-dimensional forward discrete cosine transforms for generating basic picture weighting factors, also referred to as coefficients.

The decoding station comprises a transform circuit which, for the purpose of realizing a two-dimensional inverse discrete cosine transform, is adapted to successively perform two one-dimensional inverse discrete cosine transforms in order to recover a picture signal corresponding to the original picture signal from the received basic picture weighting factors.

Such a television system may form part of a television broadcasting system in which case the encoding station forms part of the television broadcasting transmitter and each TV receiver is provided with a decoding station. The transmission medium is the atmosphere in this case and the digital picture signal is transmitted in a given TV channel.

Such a system may alternatively form part of a video recorder in which case the transmission medium is constituted by a video tape.

A(2). Description of the Prior Art

As is generally known, a digital picture signal can be subjected to a two-dimensional transform to reduce its bit rate. For performing such a transform, a television picture is partitioned into sub-pictures each of $N \times N$ pixels and each sub-picture is considered as the sum of $N \times N$ mutually orthogonal basic pictures $B_{i,k}$ each likewise of $N \times N$ pixels and each with its own weighting factor $y_{i,k}$; $i, k = 0, 1, 2, \ldots, N-1$.

Due to the correlation between the pixels of a sub-picture, the information is concentrated in a limited number of basis pictures. Only the associated weighting factors are important and the other weighting factors can be ignored. Due to this two-dimensional transform, a block of $N \times N$ pixels is thus converted into a block of $N \times N$ weighting factors. Of these weighting factors, however, only a limited number needs to be transferred. For this reason, a significant bit rate reduction is achieved with respect to the direct transmission of the digital picture signal.

In order to determine the weighting factors, a sub-picture of $N \times N$ pixels is mathematically considered as a $N \times N$ matrix X and the weighting factors are also arranged in accordance with an $N \times N$ matrix Y. Furthermore, an orthogonal $N \times N$ transform matrix A is defined which relates to the selected collection of basic pictures $B_{i,k}$. More particularly it holds that:

$$B_{i,k} = A_i A_k^T \quad (1)$$

In this expression, $A_i$ represents an $N \times N$ matrix in which each column is equal to the i-th column of the transform matrix A and $A_k^T$ represents a matrix each row of which is equal to the k-th row of the matrix A. These weighting factors now follow from the matrix multiplication $$Y = A^T X A \quad (2)$$

In this expression, $A^T$ represents the transposed matrix of A.

For more information relating to the above reference is made to Reference 1.

For the calculation of the weighting factors in accordance with expression (2), both the original transform matrix A and its transposed version should be available. Expression (2) is, however, equivalent to $$Y^T = (XA)^T A \quad (3)$$

This matrix multiplication only requires the matrix A. More particularly, the product matrix $P = XA$ can be calculated first, subsequently, P can be transposed, and finally $Y^T = P^T A$ can be calculated. A device for performing the matrix multiplication defined in expression (3) is extensively described in Reference 2. For transposing P use is made of an intermediate memory into which P is written row by row and is read column by column. Since X and $P^T$ are multiplied by the same matrix A, the same circuit can in principle be used for both multiplications.

In order to recover the original pixels (matrix X) from the weighting factors thus obtained (matrix Y), these weighting factors are subjected to an inverse transform. This is defined as follows:

$$X = A Y A^T \quad (4)$$

In conformity with the foregoing, this expression is equivalent to $$X = A (AY^T)^T \quad (5)$$

In conformity with the foregoing, the product matrix $AY^T$ will be indicated by P'.

The above-mentioned product matrices $P = XA$, $Y^T = P^T A$, $P' = AY^T$ and $X = AP'^T$ are obtained from a series of vector matrix multiplications. For example, in expression (3) a row of X is multiplied by A in order to obtain the corresponding row of P. In this connection such a vector matrix multiplication will be referred to as a one-dimensional transform. More particularly, P is obtained by a one-dimensional forward transform of each of the N rows (vectors) of X and $Y^T$ is obtained by a one-dimensional forward transform of each of the N rows (vectors) of $P^T$. These transforms are also referred to as one-dimensional because an element of P and $Y^T$ is determined by the elements of only one line of the sub-picture X and $P^T$, respectively. Since each element of a column of P is determined by another line of the sub-picture X, $Y^T$ is referred to as a two-dimensional transform of X.

Corresponding considerations apply to P' and X in expression (5) in which P' is obtained from one-dimensional inverse transforms of $Y^T$ and in which X is again obtained from one-dimensional inverse transforms of $P'^T$.

The number of weighting factors which need not be transferred is found to be closely related to the structure of the basis pictures chosen and hence to the transform matrix A chosen. The most optimum and currently frequently used transform matrix is the discrete cosine transform matrix whose elements $a_{i,k}$ are defined as follows:

$$a_{i,k} = De_k \cos\{\pi(2i+1)k/(2N)\} \quad (6)$$

for i,k = 0, 1, 2, ... N−1 with $e_k$ = $1/\sqrt{2}$ if $k = 0$
= 1 if $k > 0$ and with D being a scaling constant which is equal to 2/N if the matrix is used for performing a forward transform and which is equal to 1 if it is used for performing an inverse transform.

If an N-dimensional vector is multiplied in a conventional manner by an N×N matrix, in which case it is referred to as the direct method, $N^2$ multiplications and N(N−1) additions must be performed for obtaining an N-dimensional product vector.

A discrete cosine transform circuit whose implementation is based on this direct method is described in, for example, Reference 3. So-called fast methods are known from the References 4 and 5 in which the desired result is obtained with considerably fewer multiplications and additions. For example, if N=8, only 13 multiplications and 29 additions are performed by means of the method described in Reference 5. The drawback of this known method is that the word length of the intermediate results must be large in order to obtain sufficiently accurate final results.

B. OBJECT AND SUMMARY OF THE INVENTION

It is an object of the invention to provide a television system in which the one dimensional discrete cosine transforms are performed in an alternative manner in the encoding station and in the decoding station while achieving a considerable gain in the word length of the intermediate results with only a slight increase of the number of mathematical operations to be performed as compared with the method described in Reference 5.

According to the invention, each one-dimensional forward discrete cosine transform is performed according to the following steps:

(a) the iterative determination of two sum elements and N−2 difference elements by performing Q iteration steps, starting from an array of 1×N data elements $d_0$ to $d_{N-1}$ (which correspond to the N pixels or the N product elements of a row) in which in the q-th iteration step, the q-th order sum elements $u_{q,r}$ and the q-th order difference elements $v_{q,r}$ are obtained, for which it holds that:

$$u_{q,r} = u_{q-1,r} + u_{q-1,2-q+1_{N-r-1}}$$

$$v_{q,r} = u_{q-1,r} - u_{q-1,2-q+1_{N-r-1}}$$

r = 0, 1, 2, ... $2^{-q}N-1$
q = 1, 2, 3, ... Q
$u_{o,r} = d_r$ (i.e. the r-th pixel or product element of the row);
$u_{o,N-r} = d_{N-r}$ (i.e. the (N-r)-th pixel or product element of the row);
Q is the largest integer which is smaller than or equal to $-1 + {}^2\log N$;

(b) the iterative determination of a number of auxiliary sum elements by performing a number of further iteration steps on the difference elements obtained in the q-th iteration step in accordance with step (a), while in the j-th further iteration step, the j-th order auxiliary sum elements $w_{q,j,m}$ are obtained for which it holds that:

$$w_{q,j,m} = w_{q,j-1,m} + w_{q,j-1,2-q-j+1_{N-1-m}}$$

m = 0, 1, 2, ... $2^{-q-j}N-1$
j = 1, 2, ... $^2\log(2^{-q}N)$
$w_{q,o,m} = v_{q,m}$
$w_{q,o,2-qN-1-m} = v_{q,2-qN-1-m}$ (c) generating sub-product elements by multiplication of each of the two sum elements $u_{Q,o}$ and $u_{Q,1}$ obtained in step a) as well as the difference elements $v_{q,r}$ and the auxiliary sum elements $w_{q,j,m}$ with the associated multiplication factors from a collection of multiplication factors, each multiplication factor being constituted by a linear combination of elements of the discrete cosine transform matrix; and (d) generating the product elements of an array of 1×N product elements $P_o$ to $P_{N-1}$ by making linear combinations of said sub-product elements.

C. REFERENCES

1. Real-time Orthogonal Transformation of Colour Television pictures; H. Bacchi, A. Moreau; Philips Technical Review, Vol. 38, No. 4/5, 1978/1979, pages 119–130.
2. Method and Arrangement for digitizing a colour video signal; J. H. Peters; U.S. Pat. No. 4,405,936.
3. Multiple Point, Discrete Cosine Processor; L. W. Randy, A. Mesa; U.S. Pat. No. 4,449,194.
4. A fast Computational Algorithm For The Discrete Cosine Transform; W. H. Chen, C. H. Smith, S. C. Fralick; IEEE Transactions on Communications, Vol. COM-25, No. 9, September 1977, pages 1004–1009.
5. A New Algorithm To Compute The Discrete Cosine Transform; B. G. Lee; IEEE Transactions on Acoustics, Speech and Signal Processing, Vol. ASSP-32, No. 6, December 1984, pages 1243–1245.
6. Method and Arrangement for Digitizing a Time-Discrete Video Signal Using a Picture Transform Coding; J. H. Peters; U.S. Pat. No. 4,398,217.
7. Terminology in Digital Signal Processing; L. R. Rabiner C. S.; IEEE Transactions on Audio and Electroacoustics, Vol. AU-20, No. 5, December 1972, pages 322–337.
8. Multiport Register File; Daniel F. Chan U.S. Pat. No. 4,491,937.
9. Multiport Register Implementation A. Furman U.S. Pat. No. 4,554,645.

D. BRIEF DESCRIPTION OF THE FIGURES

FIG. 3 shows a picture built up from pixels and divided into sub-pictures;

FIG. 4 shows an 8×8 DCT matrix;

FIG. 5 shows the result of the product of 8 pixels with the 8×8 DCT matrix shown in FIG. 4;

FIG. 6 shows a modification of the equations shown in FIG. 5 constituting the new DCT algorithm;

E. EXPLANATION OF THE INVENTION

E(1). General structure of the television system

Figure 1:
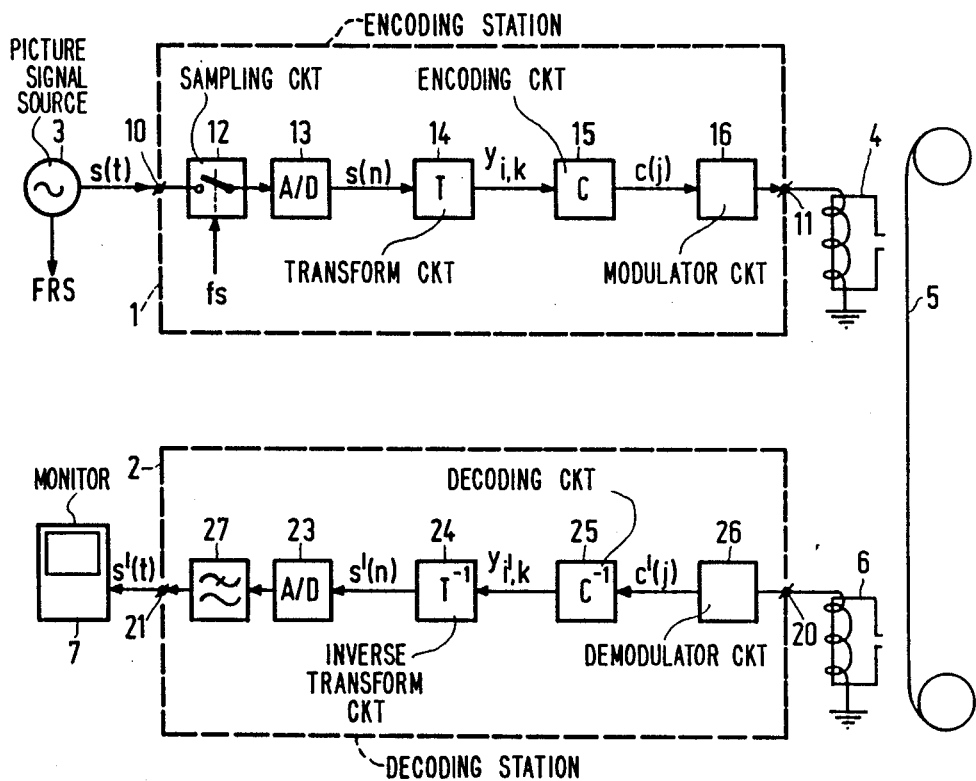
FIG. 1 shows diagrammatically a video recorder provided with the television system according to the invention.

FIG. 1 shows diagrammatically a video recorder provided with the television system according to the invention. This television system comprises an encoding station 1 and a decoding station 2. The encoding station 1 has an input 10 for the reception of picture signals s(t) which are supplied by a picture signal source 3, for example a video camera. The output 11 of this encoding station 1 is connected to a write head 4 by means of which the processed analog picture signal s(t) can be registered on a magnetic tape 5. To regain the original picture signal, a read head 6 is connected to the input 20 of the decoding station 2 for converting the information present on the magnetic tape 5 into electrical signals. The decoding station 2 supplies an analog picture signal s'(t) from its output 21, which signal can be applied to a monitor 7.

In the encoding station 1, the analog picture signal s(t) is sampled in a sampling circuit 12 at a suitably chosen sampling frequency of approximately 10 MHz so that a series of picture signal samples, also referred to as pixels, is obtained. These pixels are encoded in an analog-to-digital converter 13 into, for example, 8-bit PCM words s(n). Furthermore, these PCM words s(n) are applied to a transform circuit 14 whose structure will be described hereinafter. In this respect, it is to be noted that the transform circuit 14 is adapted to perform a two-dimensional discrete cosine transform. To this end, it divides a television picture into sub-pictures of N×N pixels $x_{i,k}$ each and transforms each sub-picture into an array of N×N weighting factors $y_{i,k}$; i,k=0, 1, 2, ... N−1. These weighting factors are subsequently applied to an encoding circuit 15, for example a so-called scene adaptive encoder many examples of which have been described in literature. The encoding circuit 15 converts each array of N×N weighting factors, with a total of $8N^2$ bits in this embodiment, into a series of transmission words c(j) of variable length with a total number which is considerably smaller than $8N^2$ bits. The bits of these transmission words are applied via a modulator circuit 16 to the write head 4 and registered on the magnetic tape 5.

In the decoding station 2, the signal supplied by the read head 6 is converted in a demodulator circuit 26 into transmission words c'(j) which correspond to the transmission words c(j) which are received in the encoding station 1 by the modulator circuit 16. These transmission words c'(j) are applied to a decoding circuit 25 which converts each series of transmission words into an array of weighting factors $y'_{i,k}$. This array of weighting factors is in turn applied to an inverse discrete cosine transform circuit 24 which converts this array of weighting factors into an array of pixels $x'_{i,k}$ and which supplies the picture signal samples s'(n) corresponding to the picture signal samples s(n) which are supplied by the analog-to-digital converter 13 in the encoding station 1. These picture signal samples s'(n) are subsequently applied to a series arrangement of a digital-to-analog converter 23 and a low-pass filter 27 so that an analog picture signal s'(t) is obtained which can be displayed on the monitor 7 and which corresponds to the picture signal s(t) supplied by the picture signal source 3.

It is to be noted that in this embodiment, the picture signal source 3 supplies a picture reset pulse FRS at the end of each full picture, which pulse can be used for several purposes.

E(2) The transform circuit

As stated in the previous section, the transform circuit 14 is adapted to subject sub-pictures of N×N pixels to a two-dimensional discrete cosine transform. An embodiment of such a transform circuit is shown diagrammatically in FIG. 2A. This embodiment is based on the expression (3) stated in section A(2). In this embodiment the transform circuit 14 has an input 14.01 to which the pixels s(n) are applied and an output 14.02 at which the weighting factors $y_{i,k}$ occur. Two picture memories 14.03(1) and 14.03(2) are connected to the input 14.01. They are provided with addressable memory locations and are controlled by write/read commands WR1 and WR2 in such a way that, for example, only the visible pixels of the visible lines of two successive fields of a picture are written in one of them, while simultaneously the pixels of the lines of the two fields of a preceding picture stored in the other picture memory are read. The address AD1, AD2 applied to the address input of the relevant picture memory determines at which location in the memory a pixel is stored or from which location a pixel is read.

Figure 3:
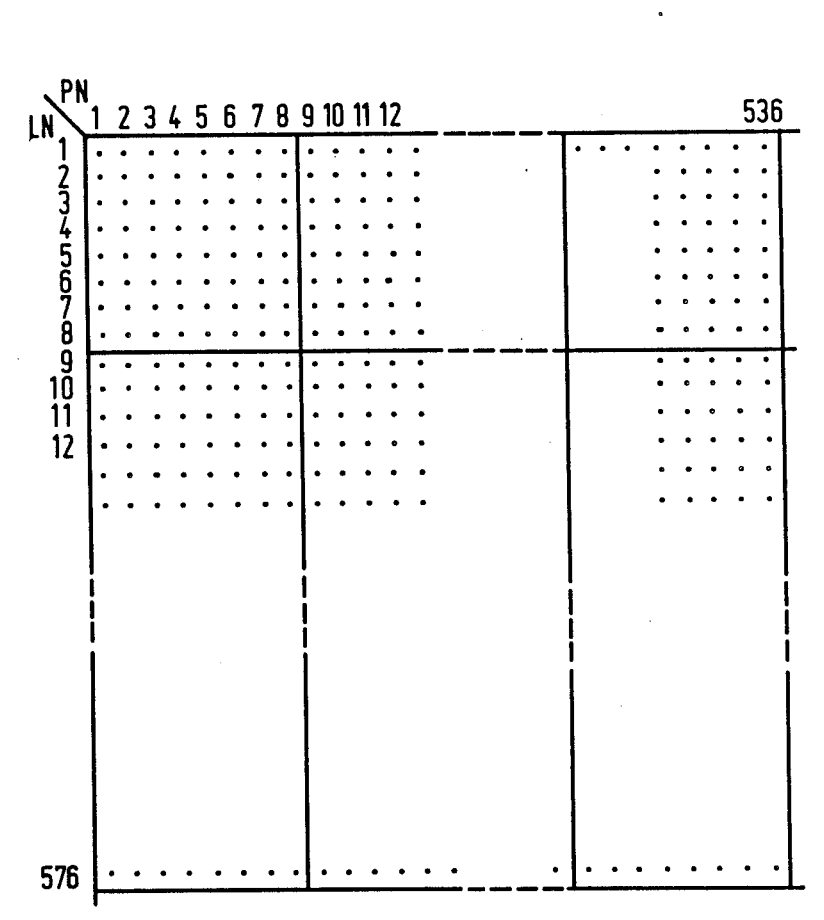

More particularly, received visible pixels of visible picture lines are written line by line into the picture memory. First the pixels of the odd lines and then those of the even lines. After all visible pixels of a picture are written, the picture memory comprises, for example the pixels indicated by dots in FIG. 3. In this FIG. 3, the row numbers LN of the picture memory in which visible pixels are written are shown in the vertical direction and the column numbers PN of the picture memory in which visible pixels are written are shown in the horizontal direction. When reading the contents of the picture memory, each picture is divided into sub-pictures of N×N pixels. Such a division is shown diagrammatically for N=8 in FIG. 3. A sub-picture will hereinafter be indicated by X and a pixel thereof by $x_{i,k}$.

The pixels of such a sub-picture are applied row by row to a one-dimensional transformer 14.04. In this transformer the sub-picture X is multiplied by a fixed transform matrix A which is also an 8×8 matrix in this case, namely a 8×8 discrete cosine transform matrix (abbreviated DCT matrix). The 8×8 product matrix P=XA consisting of the elements $P_{i,k}$ is obtained thereby.

Two sub-picture memories 14.05(.) are connected to the output of this one-dimensional transformer 14.04. Like the picture memories 14.03(.), they have addressable memory locations and are controlled by write/read commands WR3 and WR4 in such a way that the elements of the product matrix P are written in one of the two memories, while the elements of the preceding product matrix P stored in the other memory are read. More particularly, the elements $P_{i,k}$ are written row by row in such a memory and read column by column so that the transposed product matrix $P^T$ is obtained. The respective addresses AD3 and AD4, which are applied to the address inputs, determine at which location a product element is stored or at which location a product element is read.

The outputs of the sub-picture memories 14.05(.) are connected to the input of a further one-dimensional transformer 14.06 in which the transposed product matrix $P^T$ is multiplied by the transform matrix A. The weighting factors obtained thereby are written in a coefficient memory 14.07(1) or in a coefficient memory 14.07(2). Both of these memories comprise $N \times N$ ($=8 \times 8$ in this embodiment) memory locations which are likewise addressable by means of addresses applied to their address inputs. In the embodiment shown, it has been assumed that the previously mentioned addresses AD3 and AD4 can be utilized for this purpose. Furthermore, it is assumed that they are also controlled by the write/read commands WR3, WR4 in such a way that the elements y(i,k) of the product matrix $P^T A$ are written row by row in one of the two memories, while the elements of the preceding product matrix $P^T A$ stored in the other memory are read column by column so that the elements $y_{i,k}$ of the weighting factor matrix Y appear one after the other at the output 14.02.

Figure 2A:
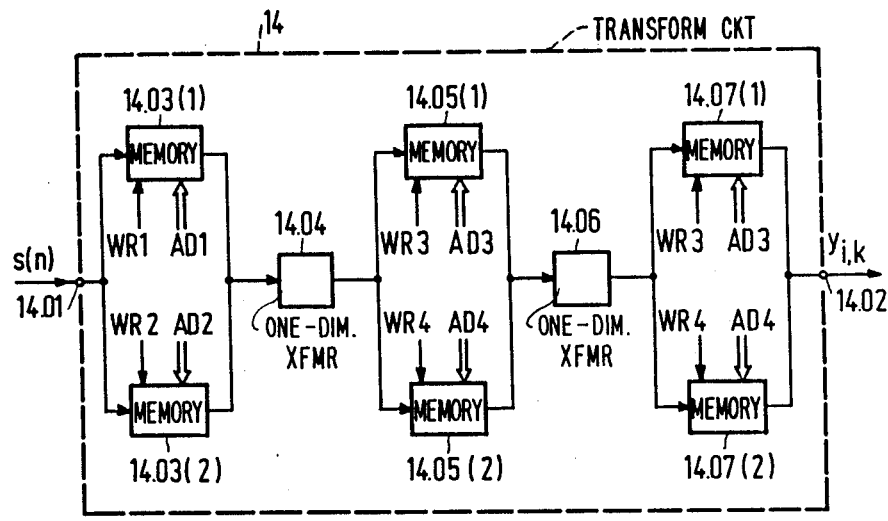
FIG. 2A shows a transform circuit for use in the television system shown in FIG. 1.
Figure 2B:
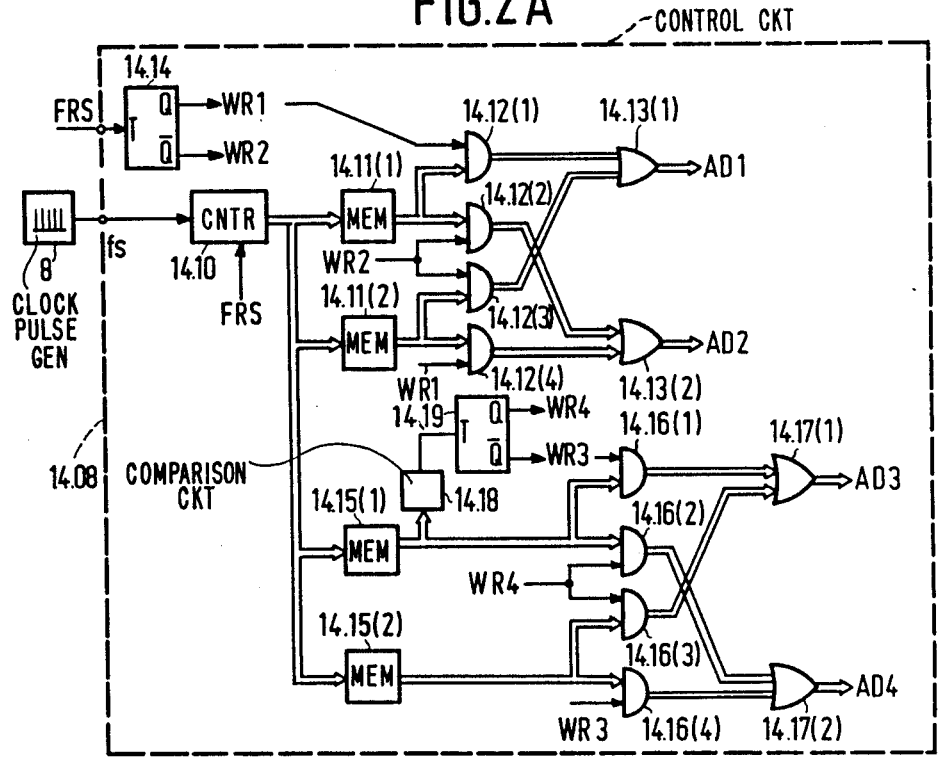
FIG. 2B shows a control circuit for the transform circuit of FIG. 2A.

For controlling the transform circuit shown in FIG. 2A, the control circuit 14.08 shown in FIG. 2B is provided. It receives clock pulses occurring at a rate $f_s$ from a clock pulse generator 8. It is to be noted that these clock pulses are also applied as sampling pulses to the sampling circuit 12 (see FIG. 1). In this control circuit 14.08, the sampling pulses are applied to a pixel counter 14.10 whose counting position ranges from zero to a number which is equal to the number of pixels constituting a full picture. This counter 14.10 is reset at the commencement of each new picture by picture reset pulses FRS which are supplied by the video signal source 3 (FIG. 1). The counting positions of this pixel counter 14.10 are applied as addresses to the address inputs of two memories 14.11(2) each in the form of a ROM. More particularly, the ROM 14.11(1) supplies the addresses for the picture memories 14.03(.) in the sequence in which the pixels must be read (read addresses), while the ROM 14.11(2) supplies the addresses for the picture memories 14.03(.) in the sequence in which pixels must be written into the picture memory (write addresses).

The addresses supplied by these ROMs 14.11(.) are applied via AND gate circuits 14.12(.) and OR gate circuits 14.13(.) to the address inputs of the picture memories 14.03(.). In order to achieve that the read and write addresses applied to a picture memory 14.03(.) alternate with each other upon each new picture, the picture reset pulses FRS are also applied to a T-flip-flop 14.14, the Q output thereof supplying the write/read command WR1 and the $\overline{Q}$ output supplying the write/read command WR2. These commands are applied to the AND gate circuits 14.12(.) in the manner shown.

For generating the read and write addresses for the memories 14.05(.) and 14.07(.), the counting positions of pixel counter 14.10 are also applied to two further memories 14.15(.) which are both in the form of ROMs and in which the ROM 14.15(1) supplies $N \times N$ read addresses for the memories 14.05(.) and 14.07(.) and the ROM 14.15(2) supplies $N \times N$ write addresses. These addresses are applied via AND gate circuits 14.16(.) and OR gate circuits 14.17(.) to the address inputs of the memories 14.05(.) and 14.07(.), in order to achieve that the read and write addresses alternate with each other upon each new sub-picture, the read addresses of ROM 14.15(1) are also applied to a comparison circuit 14.18 which applies a control pulse to the T input of a T-flip-flop 14.19 whenever a predetermined read address occurs. The Q output of this T-flipflop 14.19 supplies the write/read command WR4 and its $\overline{Q}$ output supplies the write/read command WR3. These commands are applied to the AND gate circuits 14.16(.) in the manner shown.

E(3). THE ONE-DIMENSIONAL TRANSFORMER

E(3.1) Theoretical background

In the one-dimensional transformers 14.04 and 14.06 a row of pixels of the sub-picture X and a column of product elements of the product matrix P, as the case may be, are each time multiplied by the $N \times N$ DCT matrix A. Since both multiplications are of the same kind, the multiplication of an array of $1 \times N$ data elements $d_o$ to $d_{N-1}$ by the DCT matrix A will hereinafter be described in general terms. This multiplication will be referred to as transform process. In conformity with the foregoing, N will be chosen to be 8. These data elements thus represent, for example, the pixels of the i-th row of X. The array of $1 \times N$ product elements obtained by this multiplication will be indicated by $P_o, \ldots P_{N-1}$.

The elements of the DCT matrix are defined in expression (6) and shown in FIG. 4 for $N=8$. As is apparent therefrom, this DCT matrix has a very specific structure due to the periodical character of the cosine function. More particularly, only $N-1$ ($=7$) digits which are mutually different in absolute value can be recognized in this matrix. These digits will be referred to as transform elements and will be indicated by $C^m{}_{2N}$ with $m=0, 1, 2, \ldots N-1$. The absolute value of each element $a_{i,k}$ of the discrete cosine transform matrix in expression (6) can be equated to such a transform element if they are defined as follows:

$$C^m{}_{2N} = D \cos [\pi m/(2N)] \qquad (7)$$

For example, it holds that $a_{i,O} = D/\sqrt{2}$ which, for $N=8$, corresponds to $D \cos [4\pi/16]$ and which is equal to $C^4{}_{16}$. The relationship between the data elements $d_k$, the product elements $p_k$ and these transform elements $C^m{}_{2N}$ is shown in FIG. 5 for $N=8$. These equations can be rewritten in the way as shown in FIG. 6. As is apparent from these equations, data elements $d_k$ are multiplied by linear combinations of the transform elements $C^1{}_{16}$ to $C^7{}_{16}$. These linear combinations of transform elements will hereinafter be indicated by multiplication factors.

Figure 7:
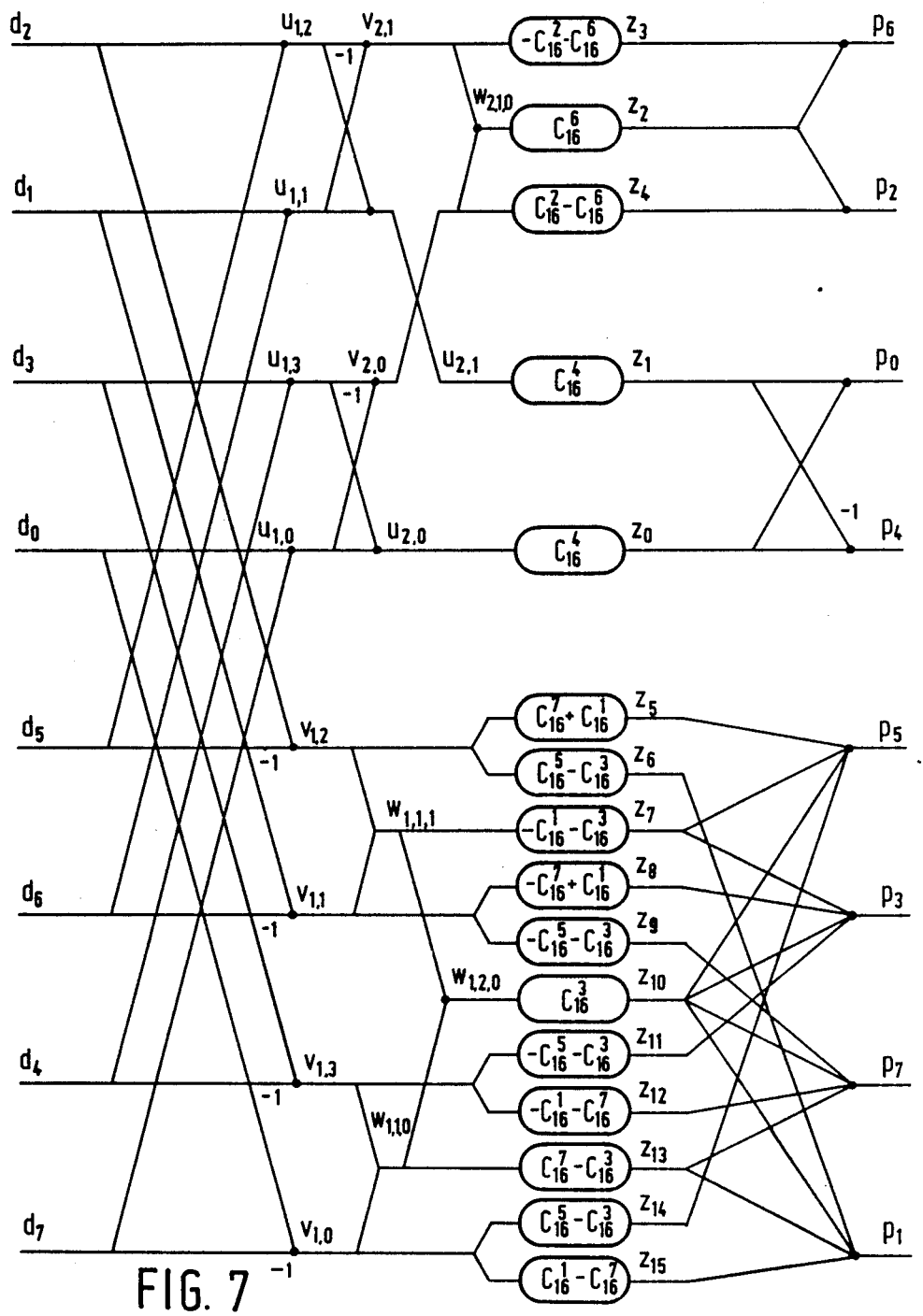
FIG. 7 shows a diagram of the new DCT algorithm.

The mathematically expressed forward transform shown in FIG. 6 for $N=8$ is shown in FIG. 7 in the form of a diagram. This diagram comprises a number of combination points which are marked by dots and at which the data elements applied to such a dot are added together or subtracted from one another. In the latter case, the digit-1 is indicated next to a branch terminating at said combination point. Furthermore, a plurality of nodes is present from which a given data element is applied via different branches to different combination points.

It is apparent from this diagram that for the calculation of the product elements $p_k$, it is possible to first add or subtract those data elements which must be multiplied by the same multiplication factor. Only thereafter is the relevant multiplication performed. It is also apparent from this Figure that for each array of eight data elements, only 16 multiplications and 16 adding/subtracting operations preceding and following these multiplications need to be performed. In this respect it is to be noted that two or more multiplications do not occur in any branch of the diagram, which property is important for determining the word length of the intermediate results. In FIG. 7 these intermediate results are indicated by u, v and w. As is apparent from this diagram, the intermediate results are obtained in a plurality of successive iteration steps. In the first iteration step, the first-order sum elements $u_{1,r}$ and the first-order difference elements $v_{1,r}$ are obtained by performing adding and subtracting operations. The first-order sum elements $u_{1,r}$ are converted in a second iteration step into second-order sum elements $u_{2,r}$ and second-order difference elements $v_{2,r}$. For the relationship between the q-th-order sum and difference elements which are obtained in the q-th iteration step and the q-1st-order sum elements obtained in the previous iteration step, it generally holds that $$u_{q,r} = u_{q-1,r} + u_{q-1,2^{-q+1}N-r-1} \quad (8a)$$

$$v_{q,r} = u_{q-1,r} - u_{q-1,2^{-q+1}N-r-1} \quad (8b)$$

with
 $r = 0, 1, 2, \ldots 2^{-q}N - 1$
 $q = 1, 2, \ldots Q$
 $u_{o,r} = d_r$
 $u_{o,N-r} = d_{N-r}$ in which Q represents the largest integer which is smaller than or equal to $-1 + {}^2\log N$.

The sum elements $u_{o,r}$ and $u_{o,N-r}$ will hereinafter be referred to as the zero-order elements.

The difference elements obtained in the q-th iteration step are subjected to a plurality of further iteration steps in which a plurality of auxiliary sum elements is obtained from the difference elements $v_{q,r}$. In the diagram shown in FIG. 7, the auxiliary sum element obtained in the j-th iteration step starting from the elements $v_{q,r}$ is generally denoted by $w_{q,j,m}$ in which m is the ordinal number of the auxiliary sum element in the j-th iteration step. In conformity with the foregoing, $w_{q,j,m}$ will be referred to as j-th order auxiliary sum element. For the relationship between the j-th order and the j-1st order auxiliary sum elements, it holds that $$w_{q,j,m} = w_{q,j-1,m} + w_{q,j-1,2^{-q-j+1}N-1-m} \quad (9)$$

with
 $m = 0, 1, 2, \ldots 2^{-q-j}N - 1$
 $j = 1, 2, 3, \ldots {}^2\log(2^{-q}N)$
 $w = v_{q,m}$ $$w_{q,o,2^{-q}N-1-m} = v_{q,2^{-q}N-1-m}$$

The sum elements $u_{2,0}$ and $u_{2,1}$ (generally $u_{Q,0}$ and $u_{Q,1}$) all difference elements $v_{q,r}$ as well as all auxiliary sum elements $w_{q,j,m}$ are multiplied by a suitably chosen multiplication factor and finally the sub-products obtained thereby are selectively combined with one another. This means that each time certain sub-products are added together or subtracted from one another in order to supply a product element $p_k$.

E(3.2). An embodiment of the DCT transformer

Figure 8:
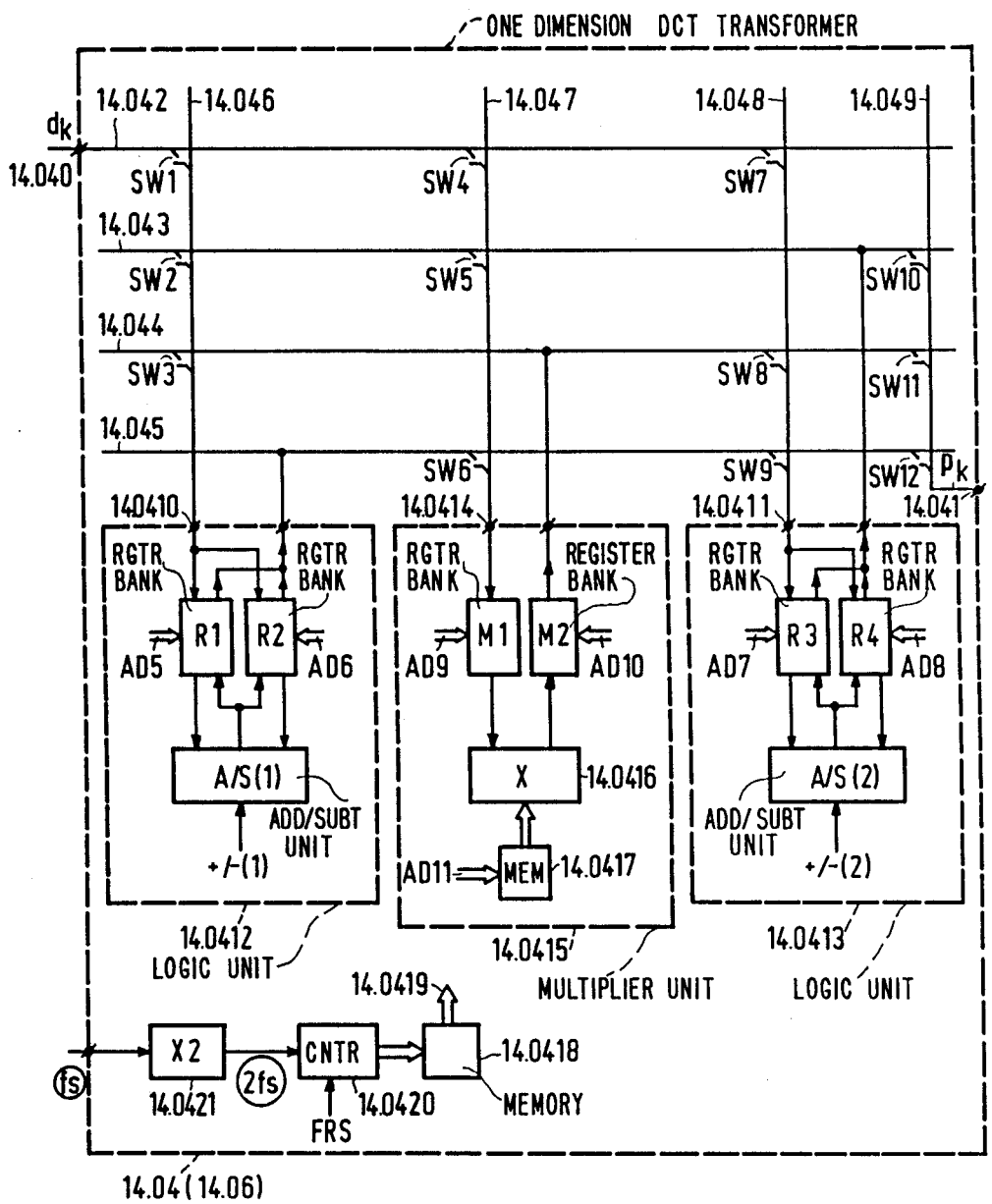
FIG. 8 shows a device for performing the new DCT algorithm.

For the sake of completeness, FIG. 8 shows a one-dimensional DCT transformer 14.04 or 14.06 for performing the new DCT transform shown in FIG. 7. It has an input 14.040 and an output 14.041. A data bus 14.042, through which the received data elements $d_k$ are transported, is connected to the input. For the sake of completeness, it is to be noted that the bits of these data elements are assumed to be available in parallel so that the data bus 14.042 consists of a number of parallel lines corresponding to this number of bits. In addition to the above-mentioned data bus, there are three data buses 14.043, 14.044 and 14.045 each consisting of, for example, 12 parallel lines. The data buses 14.042, 14.043 and 14.044 can be connected to a column bus 14.046 by means of switching devices SW1, SW2, SW3. The data buses 14.042, 14.043, 14.045 can be connected to a column bus 14.047 by means of switching devices SW4, SW5, SW6. The data buses 14.042, 14.044, 14.045 can be connected to a column bus 14.048 by means of switching devices SW7, SW8, SW9. Finally, the data buses 14.043, 14.044, 14.045 can be connected to the output 14.041 via a column bus 14.049 by means of switching devices SW10, SW11, SW12.

The column buses 14.046 and 14.048 are each connected to the inputs 14.0410, 14.0411 of arithmetic logic units 14.0412 and 14.0413, respectively. The column bus 14.047 is connected to the input 14.0414 of a multiplier unit 14.0415.

The arithmetic logic units 14.0412 and 14.0413 each comprise two register banks R1, R2 and R3, R4, respectively. The register banks comprise, for example, 12 registers of 12 bits each and are more particularly constituted by a so-called multiport register bank (see, for example References 8 and 9). The registers of these banks are addressable for which purpose each register bank has an address input for the reception of addresses AD5, AD6, AD7, AD8. Each register bank has an input which is connected to the input 14.0410 and 14.0411, respectively, of the relevant arithmetic logic unit. They also have outputs which are connected to inputs of an adding/subtracting unit A/S(.).

TABLE 1a

| T | R1 | | | | | | | | R2 | | | | | A/S(I) | M1 $m_0\ m_1$ | M2 $m_0\ m_1$ |
|---|---|---|---|---|---|---|---|---|---|---|---|---|---|---|---|---|
| | $r_0$ | $r_1$ | $r_2$ | $r_3$ | $r_4$ | $r_5$ | $r_6$ | $r_7$ | $r_8\ r_9\ r_{10}\ r_{11}$ | $r_0$ | $r_1$ | $r_2$ | $r_3$ | $r_4$ | $r_5\ r_6\ r_7\ r_8\ r_9\ r_{10}\ r_{11}$ | | |
| 1 | $d_0$ | | | | | | | | | | | | | | | | |
| 2 | | $d_1$ | | | | | | | | | | | | | | | |
| 3 | | | $d_2$ | | | | | | | | | | | | | | |
| 4 | | | | $d_3$ | | | | | | | | | | | | | |
| 5 | | | | | $v_{1,3}$ | | | | | $d_4$ | | | | | | | |
| 6 | | | | | | $v_{1,2}$ | | | | | $d_5$ | | | | | | |
| 7 | | | | | | | $u_{1,1}$ | | | | | $d_6$ | | | | | |
| 8 | | | | | | | | $u_{1,0}$ | | | | | $d_7$ | | | | |
| 9 | | | | | | | | | | | | | | $v_{1,0}$ | $d_3 - d_4 = v_{1,3}$ | | |
| 10 | | | | | | | | | | | | | | | $d_3 + d_4 = u_{1,3}$ | $v_{1,3}$ | $z_{11}$ |
| 11 | | | | | $w_{1,1,1}$ | | | $u_{2,0}$ | | | | $u_{1,2}$ | | | $d_2 + d_5 = v_{1,2}$ | $v_{1,2}$ | $z_{12}$ |
| 12 | | | | | | | | | | | | | $v_{1,1}$ | | $d_2 - d_5 = u_{1,2}$ | $v_{1,1}$ | $z_5$ |
| 13 | | | | | | | | | | | | | | $w_{1,1,0}$ | $d_1 - d_6 = v_{1,1}$ | $v_{1,0}$ | $z_6$ |
| 14 | | | | | | | | | | | | | | | $d_1 + d_6 = u_{1,1}$ | $w_{1,1,1}$ | $z_8$ |
| 15 | | | | | | | | $v_{2,1}$ | | | | | $v_{2,0}$ | | $d_0 - d_7 = v_{1,0}$ | $w_{1,1,0}$ | $z_9$ |
| 16 | | | | | | | | $w_{2,1,0}$ | | | | | | $w_{1,2,0}$ | $d_0 + d_7 = u_{1,0}$ | $v_{2,0}$ | $z_{14}$ |
| 1 | $d_0$ | | | | | | | | | | | | | $u_{2,1}$ | $v_{1,1} + v_{1,2} = w_{1,1,1}$ | $u_{2,0}$ | $z_{15}$ |
| 2 | | $d_1$ | | | | | | | | | | | | | $v_{1,3} + v_{1,0} = w_{1,1,0}$ | $w_{1,2,0}$ | $z_7$ |
| 3 | | | $d_2$ | | | | | | | | | | | | $u_{1,0} + u_{1,3} = v_{2,0}$ | $v_{2,1}$ | $z_{13}$ |
| 4 | | | | $d_3$ | | | | | | | | | | | $w_{1,1,1} + w_{1,1,0} = w_{1,2,0}$ | $u_{2,1}$ | $z_4$ |
| 5 | | | | | $v_{1,3}$ | | | | | $d_4$ | | | | | $u_{1,1} - u_{1,2} = v_{2,1}$ | $w_{2,1,0}$ | $z_0$ |
| 6 | | | | | | $v_{1,2}$ | | | | | $d_5$ | | | | $u_{1,1} + u_{1,2} = u_{2,1}$ | $v_{1,3}$ | $z_{10}$ |
| 7 | | | | | | | $u_{1,1}$ | | | | | $d_6$ | | | $v_{2,1} + v_{2,0} = w_{2,1,0}$ | $v_{1,2}$ | $z_3$ |
| 8 | | | | | | | | $u_{1,0}$ | | | | | $d_7$ | | $d_3 - d_4 = v_{1,3}$ | $v_{1,1}$ | $z_1$ |
| 9 | | | | | | | | | | | | | | $v_{1,0}$ | $d_3 + d_4 = u_{1,3}$ | $v_{1,0}$ | $z_2$ |
| 10 | | | | | | | | | | | | | | | $d_2 + d_5 = v_{1,2}$ | $w_{1,1,1}$ | $z_{12}$ |
| 11 | | | | | $w_{1,1,1}$ | | | $u_{2,0}$ | | | | $u_{1,2}$ | | | $d_2 - d_5 = u_{1,2}$ | $w_{1,1,0}$ | $z_5$ |
| 12 | | | | | | | | | | | | | $v_{1,1}$ | | $d_1 - d_6 = v_{1,1}$ | $v_{2,0}$ | $z_6$ |
| 13 | | | | | | | | | | | | | | $w_{1,1,0}$ | $d_1 + d_6 = u_{1,1}$ | $u_{2,0}$ | $z_8$ |
| 14 | | | | | | | | | | | | | | | $d_0 - d_7 = v_{1,0}$ | $w_{1,2,0}$ | $z_9$ |
| 15 | | | | | | | | $v_{2,1}$ | | | | | $v_{2,0}$ | | $v_{1,1} + v_{1,2} = w_{1,1,1}$ | $v_{2,1}$ | $z_{14}$ |
| 16 | | | | | | | | | | | | | | $w_{1,2,0}$ | $v_{1,3} + v_{1,0} = w_{1,1,0}$ | | $z_{15}$ |
| 1 | | | | | | | | | | | | | | $u_{2,1}$ | $u_{1,0} + u_{1,3} = v_{2,0}$ | | $z_{13}$ |
| 2 | | | | | | | | | | | | | | | $w_{1,1,1} + w_{1,1,0} = w_{1,2,0}$ | | $z_4$ |
| 3 | | | | | | | | | | | | | | | $u_{1,1} - u_{1,2} = v_{2,1}$ | | $z_0$ |
| 4 | | | | | | | | | | | | | | | $u_{1,1} + u_{1,2} = u_{2,1}$ | | $z_{10}$ |
| 5 | | | | | | | | | | | | | | | $v_{2,1} + v_{2,0} = w_{2,1,0}$ | | $z_3$ |
| 6 | | | | | | | | | | | | | | | | | $z_1$ |
| 7 | | | | | | | | | | | | | | | | | $z_2$ |
| 8 | | | | | | | | | | | | | | | | | $z_{11}$ |
| 9 | | | | | | | | | | | | | | | | | $z_{12}$ |
| 10 | | | | | | | | | | | | | | | | | $z_5$ |
| 11 | | | | | | | | | | | | | | | | | $z_6$ |
| 12 | | | | | | | | | | | | | | | | | $z_8$ |
| 13 | | | | | | | | | | | | | | | | | $z_9$ |
| 14 | | | | | | | | | | | | | | | | | $z_{14}$ |
| 15 | | | | | | | | | | | | | | | | | $z_{15}$ |
| 16 | | | | | | | | | | | | | | | | | $z_7$ |
| 1 | | | | | | | | | | | | | | | | | $z_{13}$ |
| 2 | | | | | | | | | | | | | | | | | $z_4$ |
| 3 | | | | | | | | | | | | | | | | | $z_0$ |

TABLE 1a-continued

| T | R1 | | | | | | | | | | | | R2 | | | | | | | | | | | A/S(1) | M1 | M2 |
|---|----|----|----|----|----|----|----|----|----|----|----|----|----|----|----|----|----|----|----|----|----|----|----|--------|-------|-------|
|   | $r_0$ | $r_1$ | $r_2$ | $r_3$ | $r_4$ | $r_5$ | $r_6$ | $r_7$ | $r_8$ | $r_9$ | $r_{10}$ | $r_{11}$ | $r_0$ | $r_1$ | $r_2$ | $r_3$ | $r_4$ | $r_5$ | $r_6$ | $r_7$ | $r_8$ | $r_9$ | $r_{10}$ $r_{11}$ | | $m_0$ $m_1$ | $m_0$ $m_1$ |
| 4 | | | | | | | | | | | | | | | | | | | | | | | | | | $z_7$ |
| 5 | | | | | | | | | | | | | | | | | | | | | | | | | | $z_{13}$ |
| 6 | | | | | | | | | | | | | | | | | | | | | | | | | | $z_4$ |
| 7 | | | | | | | | | | | | | | | | | | | | | | | | | | $z_0$ |
| . . | | | | | | | | | | | | | | | | | | | | | | | | | | . . |

TABLE 1b

| R3 | | | | | | | | | | | | R4 | | | | | | | | | | | | A/S(2) | CUT |
|---|---|---|---|---|---|---|---|---|---|---|---|---|---|---|---|---|---|---|---|---|---|---|---|---|---|
| $r_0$ | $r_1$ | $r_2$ | $r_3$ | $r_4$ | $r_5$ | $r_6$ | $r_7$ | $r_8$ | $r_9$ | $r_{10}$ | $r_{11}$ | $r_0$ | $r_1$ | $r_2$ | $r_3$ | $r_4$ | $r_5$ | $r_6$ | $r_7$ | $r_8$ | $r_9$ | $r_{10}$ | $r_{11}$ | | |
| $z_{11}$ | | | | | | | | | | | | | | | | | | | | | | | | | |
| | $z_{12}$ | | | | | | | | | | | | | | | | | | | | | | | | |
| | | $z_5$ | | | | | | | | | | | | | | | | | | | | | | | |
| | | | | $z_6$ | | | | | | | | | | | | | | | | | | | | | |
| | | | | | | | | $z_8$ | | | | | | | | | | | | | | | | $z_{11}+$ $z_8 =$ $p'_3$ | |
| | | | | | $p'_3$ | | | | | | | | | $z_9$ | | | | | | | | | | $z_{12}+$ $z_9 =$ $p'_7$ | |
| | | | | | | | $p'_7$ | | | | | | | | | | $z_{14}$ | | | | | | | $z_{14}+$ $z_5 =$ $p'_5$ | |
| | | | | | | $p'_5$ | | | | | | | | | | | | $z_{15}$ | | | | | | $z_{15}+$ $z_6 =$ $p'_1$ | |
| | | | | | | | | $p'_1$ | | | | | | | | | | | $z_7$ | | | | | $p'_3+$ $z_7 =$ $p'_3$ | |
| | | | | | | $p''_3$ | | | | | | | | | | | | | $z_{13}$ | | | | | $p'_5+$ $z_7 =$ $p'_5$ | |
| | | | $z_4$ | | | | $p''_5$ | | | | | | | | | | | | | | | | | $p'_7+$ $z_{13}=$ $p''_7$ | |
| | | | | | $z_0$ | | $p''_7$ | | | | | | | | | | | | | | | | | $p'_1+$ $z_{13}-$ $p''_1$ | |
| | | | | | | | | $p''_1$ | | | | | | | | | | | | | $z_{10}$ | | | | $p''_1+$ $z_{10}=$ $p_1$ | |
| | | | $z_3$ | | | | | | $p_1$ | | | | | | | | | | | | | | | $p''_3+$ $z_{10}=$ $p_3$ | |
| | | | | | | | | | | $p_3$ | | | $z_1$ | | | | | | | | | | | $z_0+$ $z_1=$ $p_0$ | |
| | | | | | | | | | $p_0$ | | | | | $z_2$ | | | | | | | | | | $z_0-$ $z_1=$ $p_4$ | |
| $z_{11}$ | | | | | | | | | | | $p_4$ | | | | | | | | | | | | | $z_4+$ $z_2=$ $p_2$ | |
| | $z_{12}$ | | | | | | | | | | | | | $p_2$ | | | | | | | | | | $z_3+$ $z_2=$ $p_6$ | |
| | | $z_5$ | | | | | | | | | | | | | | | | $p_6$ | | | | | | $p''_5+$ $z_{10}=$ $p_5$ | |
| | | | | $z_6$ | | | | | | | | | | | | | | | $p_5$ | | | | | $p''_7+$ $z_{10}=$ $p_7$ | |
| | | | | | | | | $z_8$ | | | | | | | | | | | | | $p_7$ | | | $z_{11}+$ $z_8=$ $p'_3$ | $p_0$ |
| | | | | | $p'_3$ | | | | | | | | | $z_9$ | | | | | | | | | | $z_{12}+$ $z_9=$ $p'_7$ | |
| | | | | | | | $p'_7$ | | | | | | | | | | $z_{14}$ | | | | | | | $z_{14}+$ $z_5=$ $p'_5$ | $p_1$ |
| | | | | | | $p'_5$ | | | | | | | | | | | | $z_{15}$ | | | | | | $z_{15}+$ $z_6=$ $p'_1$ | |
| | | | | | | | | $p'_1$ | | | | | | | | | | | $z_7$ | | | | | $p'_3+$ $z_7=$ $p'_3$ | $p_2$ |
| | | | | | | $p''_3$ | | | | | | | | | | | | | $z_{13}$ | | | | | $p'_5+$ $z_7=$ $p'_5$ | |
| | | | $z_4$ | | | | $p''_5$ | | | | | | | | | | | | | | | | | $p'_7+$ $z_{13}=$ $p''_7$ | $p_3$ |
| | | | | | $z_0$ | | $p''_7$ | | | | | | | | | | | | | | | | | $p'_1+$ $z_{13}=$ $p''_1$ | |
| | | | | | | | | $p''_1$ | | | | | | | | | | | | | $z_{10}$ | | | | $p''_1+$ $z_{10}=$ $p_1$ | $p_4$ |
| | | | $z_3$ | | | | | | $p_1$ | | | | | | | | | | | | | | | $p''_3+$ | |

TABLE 1b-continued

| R3 r0 | r1 | r2 | r3 | r4 | r5 | r6 | r7 | r8 | r9 | r10 | r11 | R4 r0 | r1 | r2 | r3 | r4 | r5 | r6 | r7 | r8 | r9 | r10 | r11 | A/S(2) | CUT |
|---|---|---|---|---|---|---|---|---|---|---|---|---|---|---|---|---|---|---|---|---|---|---|---|---|---|
|  |  |  |  |  | $p_3$ |  |  |  |  |  |  |  | $z_1$ |  |  |  |  |  |  |  |  |  |  | $z_{10} =$ |  |
|  |  |  |  |  |  |  |  |  |  |  |  |  |  |  |  |  |  |  |  |  |  |  |  | $z_{10} +$ | $p_5$ |
|  |  |  |  |  |  |  |  |  |  |  |  |  |  |  |  |  |  |  |  |  |  |  |  | $z_1 =$ |  |
|  |  |  |  |  |  | $p_0$ |  |  |  |  |  |  |  | $z_2$ |  |  |  |  |  |  |  |  |  | $p_0 -$ |  |
|  |  |  |  |  |  |  |  |  |  |  |  |  |  |  |  |  |  |  |  |  |  |  |  | $z_0 -$ |  |
|  |  |  |  |  |  |  |  |  |  |  |  |  |  |  |  |  |  |  |  |  |  |  |  | $z_1 =$ |  |
| $z_{11}$ |  |  |  |  |  |  | $p_4$ |  |  |  |  |  |  |  |  |  |  |  |  |  |  |  |  | $p_4$ |  |
|  |  |  |  |  |  |  |  |  |  |  |  |  |  |  |  |  |  |  |  |  |  |  |  | $z_4 +$ | $p_6$ |
|  |  |  |  |  |  |  |  |  |  |  |  |  |  |  |  |  |  |  |  |  |  |  |  | $z_2 =$ |  |
|  | $z_{12}$ |  |  |  |  |  |  |  |  |  |  |  |  |  |  |  | $p_2$ |  |  |  |  |  |  | $p_2$ |  |
|  |  |  |  |  |  |  |  |  |  |  |  |  |  |  |  |  |  |  |  |  |  |  |  | $z_3 +$ |  |
|  |  |  |  |  |  |  |  |  |  |  |  |  |  |  |  |  |  |  |  |  |  |  |  | $z_2 =$ |  |
|  |  |  | $z_5$ |  |  |  |  |  |  |  |  |  |  |  |  |  |  | $p_6$ |  |  |  |  |  | $p_6$ |  |
|  |  |  |  |  |  |  |  |  |  |  |  |  |  |  |  |  |  |  |  |  |  |  |  | $p''_5 +$ | $p_7$ |
|  |  |  |  |  |  |  |  |  |  |  |  |  |  |  |  |  |  |  |  |  |  |  |  | $z_{10} =$ |  |
|  |  |  |  | $z_6$ |  |  |  |  |  |  |  |  |  |  |  |  | $p_5$ |  |  |  |  |  |  | $p_5$ |  |
|  |  |  |  |  |  |  |  |  |  |  |  |  |  |  |  |  |  |  |  |  |  |  |  | $p''_7 +$ |  |
|  |  |  |  |  |  |  |  |  |  |  |  |  |  |  |  |  |  |  |  |  |  |  |  | $z_{10} =$ |  |
|  |  |  |  |  |  |  |  |  |  |  |  |  |  |  |  |  |  |  | $p_7$ |  |  |  |  | $p_7$ |  |
|  |  |  |  |  |  |  |  |  |  |  |  |  |  |  |  |  |  |  |  |  |  |  |  | $z_{11} +$ | $p_0$ |
|  |  |  |  |  |  |  |  |  |  |  |  |  |  |  |  |  |  |  |  |  |  |  |  | $z_8 =$ |  |
|  |  |  |  |  |  |  |  |  |  |  |  |  |  |  |  |  |  |  |  |  |  |  |  | $p'_3$ |  |
|  |  |  |  |  |  | $p'_3$ |  |  |  |  |  |  |  |  |  |  |  |  |  | $z_9$ |  |  |  | $z_{12} +$ |  |
|  |  |  |  |  |  |  |  |  |  |  |  |  |  |  |  |  |  |  |  |  |  |  |  | $z_9 =$ |  |
|  |  |  |  |  |  |  |  |  |  |  |  |  |  |  |  |  |  |  |  |  |  |  |  | $p'_7$ |  |
|  |  |  |  |  |  |  | $p'_7$ |  |  |  |  |  |  |  |  |  |  |  |  |  |  |  |  | $z_{14} +$ | $p_1$ |
|  |  |  |  |  |  |  |  |  |  |  |  |  |  |  |  |  |  |  |  |  |  |  |  | $z_5 =$ |  |
|  |  |  |  |  |  |  |  |  |  |  |  |  |  |  |  |  |  |  |  |  |  |  |  | $p'_5$ |  |
|  |  |  |  |  |  |  |  |  |  |  |  |  |  |  |  |  |  |  |  |  |  |  |  |  | $p_2$ |
|  |  |  |  |  |  |  |  |  |  |  |  |  |  |  |  |  |  |  |  |  |  |  |  |  | $p_3$ |

These units receive via a further input an adding/subtracting command $+/-(.)$ and supply sum or difference elements which are optionally stored in a register of bank R1 or R2 or in a register of bank R3 or R4. Each register-bank R1 and R2 has a further output which is connected to the data bus 14.045. Each register bank R3 and R4 also has a further output which is connected to the data bus 14.043.

The multiplier unit 14.0415 is provided with a register bank M1 consisting of, for example, two registers of 12 bits. The register bank M1 input is connected to the input 14.0414 of this unit and its output is connected to an input of a multiplier 14.0416. The latter receives the multiplication factors shown in FIG. 7 in the desired sequence at a further input. The products supplied by this multiplier are stored in a 12-bit register of an output register bank M2, the output of which is connected to the data bus 14.044. The multiplication factors received by the multiplier 14.0416 are supplied by a memory unit 14.0417 with addressable memory locations, for example a ROM. For addressing a memory location, this ROM receives an address AD11. Likewise as the registers of the register banks R1, R2, R3 and R4, the registers of the register banks M1 and M2 are also addressable. To this end they receive the respective addresses AD9 and AD10.

For generating the different addresses as well as for generating the control signals for the switching devices SW, the transformer is provided with a memory 14.0418 with addressable memory locations, such as a ROM. Each memory location comprises a plurality of bits which define the state of all elements to be controlled at a certain moment. Thus the state of the switching devices SW, the different addresses, and so forth. It appears in practice that approximately 70 bits per instant may suffice and that not more than 16 of these 12 bits memory locations are required. These bits are applied by means of a bus 14.0419 of approximately 70 parallel lines to the different elements of the circuit. This ROM is in turn addressed by addresses which are supplied by a modulo-16-counter 14.0420 which is reset by each FRS pulse generated by the video signal source 3 (see FIG. 1) and which further receives counting pulses from a frequency multiplier 14.0421 multiplying the frequency of the clock pulses applied thereto by a factor of 2. The clock pulses occur at the sampling frequency $f_s$ and are supplied, for example, by the clock pulse generator 8 (FIG. 2B).

The operation of this one-dimensional DCT transformer is shown diagrammatically in Tables 1a and 1b which show time diagrams for the device. For the sake of completeness, it is to be noted that in these Tables column T indicates the counting positions of the modulo-16-counter. The columns denoted by R1, R2, R3, R4, M1, M2 relate to the contents of the different register banks. More particularly, the columns $r_0, r_1, \ldots$, indicate the contents of the relevant registers of these register banks. The columns denoted by A/S (1) and A/S (2) indicate which quantities at this counting position T of counter 14.0420 are added together or are subtracted from one another in the adding/subtracting units A/S(1) and A/S(2), respectively. The column denoted by M2 indicates the sub-product supplied by the multiplier 14.0416 and stored in M2 with the same designation as in FIG. 7. Finally, the column denoted by OUT indicates the product elements $p_k$ occurring at the output 14.041.

The following description may be given for a correct interpretation of these Tables. At the respective counting positions $T = 1, 3, 5, 7$, data elements $d_0, d_1, d_2, d_3$ are stored in the respective registers $r_0$, $r_1$, $r_2$, $r_3$ of register bank R1.

At T=9, $d_4$ is stored in register $r_0$ of R2. In the adding-subtracting unit A/S(1), $d_4$ is now subtracted from $d_3$, resulting in $v_{1,3}$.

At T=10, $v_{1,3}$ is stored in register $r_4$ of R1 and in the adding/subtracting unit A/S(1), $d_4$ is also added to $d_3$, resulting in $u_{1,3}$.

At T=11, $u_{1,3}$ is stored in register $r_1$ of R2 and $v_{1,3}$ is stored in register M1 and multiplied by $-C^5{}_{16}-C^3{}_{16}$ so that the sub-product $z_{11}$ is obtained. The data element $d_4$ is replaced by $d_5$ in register $r_0$ of R2 and in the adding/subtracting unit A/S(1), $d_5$ is subtracted from $d_2$ resulting in $v_{1,2}$.

At T=12, $v_{1,2}$ is stored in register $r_5$ of R1, the sub-product $z_{11}$ is stored in register $m_0$ of M2, $d_2$ and $d_5$ are added together so that $u_{1,2}$ is obtained, and $v_{1,3}$ in register $m_0$ of M1 is multiplied by $C^3{}_{16}$ thus resulting in the sub-product $z_{12}$.

At T=13, $u_{1,2}$ is stored in register $r_2$ of R2, $z_{11}$ is stored in register $r_0$ of R3, and the sub-product $z_{12}$ is stored in register $m_0$ of M2. Furthermore, $v_{1,2}$ is stored in register $m_0$ of M1 and multiplied by $C^7{}_{16}+C^1{}_{16}$ resulting in the sub-product $z_5$. Furthermore, $d_6$ is stored in register $r_0$ of R2 and $d_6$ is subtracted from $d_1$ so that $v_{1,1}$ is obtained. Corresponding operations are performed at the further counting positions of counter 14.0420.

E(4). THE ONE-DIMENSIONAL INVERSE TRANSFORMER

For regaining the original video signal samples, the decoding station 2 (see FIG. 1) is provided with an inverse transform circuit 24 which is adapted to perform a two-dimensional inverse discrete cosine transform on an array of N×N basis picture weighting factors $y'_{i,k}$ which are presented to this circuit. An embodiment of such an inverse transform circuit is obtained by inverting the signal direction in the transform circuit shown in FIG. 2 and by forming the two one-dimensional inverse transformers in the way as is shown in FIG. 8 in which the contents of the ROM 14.0418 are chosen to be such that this inverse transformer operates in the desired manner.

TABLE 2a

| T | R1 $r_0$ | $r_1$ | $r_2$ | $r_3$ | $r_4$ | $r_5$ | $r_6$ | $r_7$ | $r_8$ | $r_9$ $r_{10}$ $r_{11}$ | R2 $r_0$ | $r_1$ | $r_2$ | $r_3$ | $r_4$ | $r_5$ | $r_6$ | $r_7$ $r_9$ $r_{10}$ $r_{11}$ | A/S(1) | M1 $m_0$ | $m_1$ | $m_2$ | $m_3$ |
|---|---|---|---|---|---|---|---|---|---|---|---|---|---|---|---|---|---|---|---|---|---|---|---|
| 1 | $p_0$ | | | | | | | | | | | | | | | | | | | | | | |
| 2 | | | | | | | | | | | | | | | | | | | | | | | |
| 3 | | $p_1$ | | | | | | | | | | | | | | | | | | $p_1$ | | | |
| 4 | | | | | | | | | | | | | | | | | | | | | | | |
| 5 | | | $p_2$ | | | | | | | | | | | | | | | | | $p_2$ | | | |
| 6 | | | | | | | | | | | | | | | | | | | | | | | |
| 7 | | | | $p_3$ | | | | | | | | | | | | | | | | | | $p_3$ | |
| 8 | | | | | | | | | | | | | | | | | | | | | | | |
| 9 | | | | | | | | | | | $p_4$ | | | | | | | | $p_0 + p_4 = e_0$ | | | | |
| 10 | | | | | $e_0$ | | | | | | | | | | | | | | $p_0 - p_4 = e_1$ | | | | |
| 11 | | | | | | $e_1$ | | | | | $p_5$ | | | | | | | | $p_3 + p_5 = e_7$ | | | $p_5$ | |
| 12 | $e_7$ | | | | | | | | | | | | | | | | | | | $e_0$ | | | |
| 13 | | | | | | | | | | | $p_6$ | | | | | | | | $p_2 + p_6 = e_2$ | | | $p_6$ | |
| 14 | | $e_2$ | | | | | | | | | | | | | | | | | | | $e_7$ | | |
| 15 | | | | | | | | | | | $p_7$ | | | | | | | | $p_1 + p_7 = e_{13}$ | | | | $p_7$ |
| 16 | | | | | | | | | | | $e_{13}$ | | | | | | | | $e_7 + e_{13} = e_{10}$ | | $e_2$ | | |
| 1 | $p_0$ | | | $e_{10}$ | | | | | | | | | | | | | | | | | | | |
| 2 | | | | | | | | | | | | | | | | | | | | $e_{10}$ | | | |
| 3 | | $p_1$ | | | | | | | | | | | | | | | | | | $p_1$ | | | |
| 4 | | | | | | | | | | | | | | | | | | | | | $e_{13}$ | | |
| 5 | | | $p_2$ | | | | | | | | | | | | | | | | | $p_2$ | | | |
| 6 | | | | | | | $h_0$ | | | | | | | | | | | | | | $e_1$ | | |
| 7 | | | | $p_3$ | | | | | | | | | | | | | | | | | | $p_3$ | |
| 8 | | | | | | | | | $h_6$ | | | | | | | | | | | | | | |
| 9 | | | | | | | | | | | $p_4$ | | | | | | | | $p_0 + p_4 = e_0$ | | | | |
| 10 | | | | | $e_0$ | | | | | | | | | | | $h_7$ | | | $p_0 - p_4 = e_1$ | | | | |
| 11 | | | | | | $e_1$ | | | | | $p_5$ | | | | | | | | $p_3 + p_5 = e_7$ | | | $p_5$ | |
| 12 | $e_7$ | | | | | | | $h_1$ | | | | | | | | | | | $h_0 + h_7 = d_0$ | $e_0$ | | | |
| 13 | | | | | | | | | | | $p_6$ | | | | $d_0$ | | | | $p_2 + p_6 = e_2$ | | | $p_6$ | |
| 14 | | $e_2$ | | | | | | | $h_2$ | | | | | | | | | | $h_1 +$ | | | | $e_7$ |

TABLE 2a-continued

| T | R1 $r_0$ $r_1$ $r_2$ $r_3$ $r_4$ $r_5$ $r_6$ $r_7$ $r_8$ $r_9$ $r_{10}$ $r_{11}$ | R2 $r_0$ $r_1$ $r_2$ $r_3$ $r_4$ $r_5$ $r_6$ $r_7$ $r_9$ $r_{10}$ $r_{11}$ | A/S(1) | M1 $m_0$ $m_1$ $m_2$ $m_3$ |
|---|---|---|---|---|
| 15 | | $p_7$     $d_1$ | $h_6 = d_1$ $p_1 + p_7 = e_{13}$ | $p_7$ |
| 16 | | $e_{13}$     $h_5$ | $e_7 + e_{13} = e_{10}$ | $e_2$ |
| 1 | $p_0$    $e_{10}$ | | $h_0 - h_7 = d_7$ | |
| 2 | | $h_4$     $d_7$ | $h_1 - h_6 = d_6$ | $e_{10}$ |
| 3 | $p_1$ | $d_6$ | $h_2 + h_5 = d_2$ | $p_1$ |
| 4 | $h_3$ | $d_7$ | $h_2 - h_5 = d_5$ | $e_{13}$ |
| 5 | $p_2$ | $d_5$ | $h_3 + h_4 = d_3$ | $p_2$ |
| 6 | $h_0$ | $d_3$ | $h_3 - h_4 = d_4$ | $e_1$ |
| 7 | $p_3$ | $d_4$ | | $p_3$ |
| 8 | | $h_6$ | | |
| 9 | | $p_4$ | $p_0 + p_4 = e_0$ | |
| 10 | $e_0$ | $h_7$ | $p_0 - p_4 = e_1$ | |
| 11 | $e_1$ | $p_5$ | $p_3 + p_5 = e_7$ | $p_5$ |
| 12 | $e_7$     $h_1$ | | $h_0 + h_7 = d_0$ | $e_0$ |
| 13 | | $p_6$     $d_0$ | $p_2 + p_6 = e_2$ | $p_6$ |
| 14 | $e_2$     $h_2$ | | $h_1 + h_6 = d_1$ | $e_7$ |
| 15 | | $p_7$     $d_1$ | $p_1 + p_7 = e_{13}$ | $p_7$ |
| 16 | | $e_{13}$     $h_5$ | $e_7 + e_{13} = e_{10}$ | $e_2$ |
| 1 | $p_0$    $e_{10}$ | | $h_0 - h_7 = d_7$ | |
| 2 | | $h_4$     $d_7$ | $h_1 - h_5 = d_5$ | $e_{10}$ |
| 3 | $p_1$ | $d_6$ | $h_2 + h_5 = d_2$ | $p_1$ |
| 4 | | | | |
| 5 | | | | |
| 6 | | | | |
| 7 | | | | |

TABLE 2b

| M2 $m_0$ $m_1$ | R3 $r_0$ $r_1$ $r_2$ $r_3$ $r_4$ $r_5$ $r_6$ $r_7$ $r_8$ $r_9$ $r_{10}$ $r_{11}$ | R4 $r_0$ $r_1$ $r_2$ $r_3$ $r_4$ $r_5$ $r_6$ $r_7$ $r_8$ $r_9$ $r_{10}$ $r_{11}$ | A/S(2) | OUT |
|---|---|---|---|---|
| $b_6$ | | | | |
| $b_{15}$ | | $b_6$ | | |
| $b_8$ | | $b_{15}$ | | |
| $b_{11}$ | $b_8$ | | | |
| $b_5$ | $b_{11}$ | | | |
| $b_{14}$ | $b_5$ | | | |
| $b_3$ | $b_{14}$ | | | |
| $b_4$ | $b_3$ | | | |

TABLE 2b-continued

| M2 | | | | | | R3 | | | | | | | | | | | | R4 | | | | | | | A/S(2) | OUT |
|----|----|----|----|----|----|----|----|----|----|----|----|----|----|----|----|----|----|----|----|----|----|----|----|----|----|----|
| $m_0$ $m_1$ | $r_0$ | $r_1$ | $r_2$ | $r_3$ | $r_4$ | $r_5$ | $r_6$ | $r_7$ | $r_8$ | $r_9$ | $r_{10}$ | $r_{11}$ | $r_0$ | $r_1$ | $r_2$ | $r_3$ | $r_4$ | $r_5$ | $r_6$ | $r_7$ | $r_8$ | $r_9$ | $r_{10}$ | $r_{11}$ | | |
| $b_9$ | | | | | | $b_4$ | | | | | | | | | | | | | | | | | | | $b_5 + b_6 = f_5$ | |
| $b_2$ | | | | | | $f_5$ | | | | | | | $b_9$ | | | | | | | | | | | | $b_8 + b_9 = f_8$ | |
| $b_0$ | | | $f_8$ | | | | | | | | | | | | $b_2$ | | | | | | | | | | $b_{14} + b_{15} = f_{14}$ | |
| $b_{10}$ | | | | | $f_{14}$ | | $b_0$ | | | | | | | | | | | | | | | | | | $b_4 + b_2 = f_2$ | |
| $b_7$ | | | | | | | | | | | | | $b_{10}$ | | | | | $f_2$ | | | | | | | $b_0 + f_2 = h_0$ | |
| $b_{13}$ | | | | | | $b_7$ | | | | | | | | | | | $h_0$ | | | | | | | | $b_7 + b_{10} = g_0$ | |
| $b_{12}$ | $b_{13}$ | | | | | | | | | | | | | | | | | | | | | $g_0$ | | | $f_8 + g_0 = h_6$ | |
| $b_1$ | | | | | | | | | | | | | | | | | $h_6$ | $b_{12}$ | | | | | | | $b_{13} + b_{10} = g_1$ | |
| $b_6$ | | | $b_1$ | | | | | | | | | | | | | | | | | | | $g_1$ | | | $f_{14} + g_1 = h_7$ | |
| $b_{15}$ | | | | | | $h_7$ | | | | | | | $b_6$ | | | | | | | | | | | | $b_3 + b_2 = f_1$ | |
| $b_8$ | | | | | | | | | | | | | | | | | | | | $b_{15}$ | $f_1$ | | | | | $b_1 + f_1 = h_1$ | |
| $b_{11}$ | $b_8$ | | | | | $h_1$ | | | | | | | | | | | | | | | | | | | $b_{11} + b_{12} = f_{11}$ | |
| $b_5$ | | $b_{11}$ | | | | $f_{11}$ | | | | | | | | | | | | | | | | | | | $b_1 - f_1 = h_2$ | |
| $b_{14}$ | | | $b_5$ | $h_2$ | | | | | | | | | | | | | | | | | | | | | $b_0 - f_2 = h_3$ | |
| $b_3$ | | | | $b_{14}$ | | | $h_3$ | | | | | | | | | | | | | | | | | | $f_5 + g_0 = h_5$ | |
| $b_4$ | | | | | $b_3$ | $h_5$ | | | | | | | | | | | | | | | | | | | $f_{11} + g_1 = h_4$ | |
| $b_9$ | | | | | | $b_4$ | | | | | | | | | | | | $h_4$ | | | | | | | $b_5 + b_6 = f_5$ | |
| $b_2$ | | | | | | $f_5$ | | | | | | | $b_9$ | | | | | | | | | | | | $b_8 + b_9 = f_8$ | $d_0$ |
| $b_0$ | | | $f_8$ | | | | | | | | | | | | $b_2$ | | | | | | | | | | $b_{14} + b_{15} = f_{14}$ | |
| $b_{10}$ | | | | | $f_{14}$ | | $b_0$ | | | | | | | | | | | | | | | | | | $b_4 + b_2 = f_2$ | $d_1$ |
| $b_7$ | | | | | | | | | | | | | $b_{10}$ | | | | | $f_2$ | | | | | | | $b_0 + f_2 = h_0$ | |
| $b_{13}$ | | | | | | $b_7$ | | | | | | | | | | | $h_0$ | | | | | | | | $b_7 + b_{10} = g_0$ | $d_2$ |
| $b_{12}$ | $b_{13}$ | | | | | | | | | | | | | | | | | | | | | $g_0$ | | | $f_8 + g_0$ 32 $h_6$ | |
| $b_1$ | | | | | | | | | | | | | | | | | $h_6$ | $b_{12}$ | | | | | | | $b_{13} + b_{10} = g_1$ | $d_3$ |
| $b_6$ | | | $b_1$ | | | | | | | | | | | | | | | | | | | $g_1$ | | | $f_{14} + g_1 = h_7$ | |
| $b_{15}$ | | | | | | $h_7$ | | | | | | | $b_6$ | | | | | | | | | | | | $b_3 + b_2 = f_1$ | $d_4$ |
| $b_8$ | | | | | | | | | | | | | | | | | | | | $b_{15}$ | $f_1$ | | | | | $b_1 + f_1 =$ | |

TABLE 2b-continued

| M2 | R3 | | | | | | | | | | | | R4 | | | | | | | | | | | | A/S(2) | OUT |
|---|---|---|---|---|---|---|---|---|---|---|---|---|---|---|---|---|---|---|---|---|---|---|---|---|---|---|---|
| $m_0\ m_1$ | $r_0$ | $r_1$ | $r_2$ | $r_3$ | $r_4$ | $r_5$ | $r_6$ | $r_7$ | $r_8$ | $r_9$ | $r_{10}$ | $r_{11}$ | $r_0$ | $r_1$ | $r_2$ | $r_3$ | $r_4$ | $r_5$ | $r_6$ | $r_7$ | $r_8$ | $r_9$ | $r_{10}$ | $r_{11}$ | | |
| $b_{11}$ | $b_8$ | | | | | $h_1$ | | | | | | | | | | | | | | | | | | | $h_1$ $b_{11}+$ $b_{12}=$ $f_{11}$ | $d_5$ |
| $b_5$ | | $b_{11}$ | | | | $f_{11}$ | | | | | | | | | | | | | | | | | | | $b_1-$ $f_1=$ $h_2$ | |
| $b_{14}$ | | | | $b_5$ | $h_2$ | | | | | | | | | | | | | | | | | | | | $b_0-$ $f_2=$ $h_3$ | $d_6$ |
| $b_3$ | | | | | $b_{14}$ | | | $h_3$ | | | | | | | | | | | | | | | | | $f_5+$ $g_0=$ $h_5$ | |
| $b_4$ | | | | | | $b_3$ | $h_5$ | | | | | | | | | | | | | | | | | | $f_{11}+$ $g_1=$ $h_4$ | $d_7$ |
| $b_9$ | | | | | | | $b_4$ | | | | | | | | | | $h_4$ | | | | | | | | $b_5+$ $b_5=$ $f_5$ | |
| $b_2$ | | | | | | | | | $f_5$ | | | | | | | $b_9$ | | | | | | | | | $b_9+$ $b_9=$ $f_8$ | $d_0$ |
| $b_0$ | | $f_8$ | | | | | | | | | | | | | | | | | | $b_2$ | | | | | $b_{14}+$ $b_{15}=$ $f_{14}$ | |
| $b_{10}$ | | | | $f_{14}$ | | $b_0$ | | | | | | | | | | | | | | | | | | | $b_4+$ $b_2=$ $f_2$ | $d_1$ |
| $b_7$ | | | | | | | | | | | | | | | | | | | | | | | | | | |
| $b_{13}$ | | | | | | | | | | | | | | | | | | | | | | | | | | |
| $b_{12}$ | | | | | | | | | | | | | | | | | | | | | | | | | | |
| $b_1$ | | | | | | | | | | | | | | | | | | | | | | | | | | |

Figure 9:
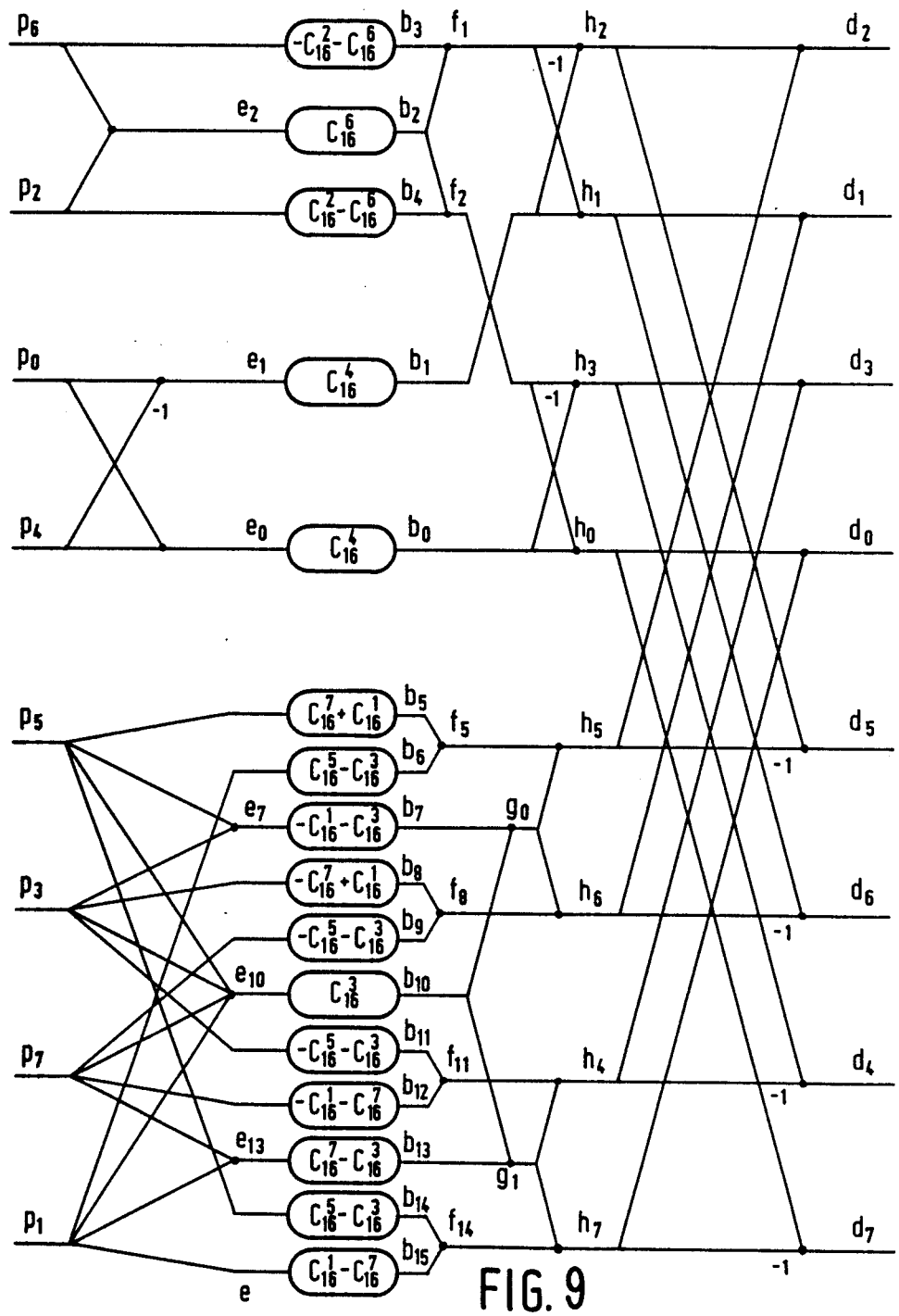
FIG. 9 shows a diagram of the inverse DCT algorithm,.

It can now easily be verified that the desired inverse transform which must be performed in each of the one-dimensional inverse transformers, is the transform which is shown in the diagram of FIG. 9. Comparison of the diagram of FIG. 9 with that of FIG. 7 shows that the first follows from the second by transposing this diagram of FIG. 7 (see Reference 7). This means that the signal direction is inverted therein, the combination points are replaced by nodes and the nodes are replaced by combination points.

The operation of the transformer shown in FIG. 8 as an inverse discrete cosine transformer is further shown in Tables 2a and 2b in which the different columns have the same significance as those in Tables 1a and 1b.

What is claimed is:

1. A television transmission system for the transmission of a picture represented by a digital picture signal from an encoding station to a decoding station, the encoding station having means for partitioning the picture into sub-pictures each of $N \times N$ pixels, and having a picture transform circuit adapted to perform a two-dimensional forward discrete cosine transform on each of the sub-pictures for generating an array of $N \times N$ basis picture weighting factors, said picture transform circuit being constituted by a cascade arrangement of two one-dimensional forward discrete cosine transformers each adapted to perform a forward transform in which an array of $1 \times N$ data elements $d_0$ to $d_{N-1}$ applied to the transformer is transformed into an array of $1 \times N$ product elements $p_0$ to $p_{N-1}$, characterized in that the forward transform comprises the following steps:

(a) the iterative determination of two sum elements and $N-2$ difference, elements by performing Q iteration steps, starting from the N data elements $d_0$ to $d_{N-1}$, in which in the q-th iteration step, the q-th order sum elements $u_{q,r}$ and the q-th order difference elements $v_{q,r}$ are obtained for which it holds that:

$$u_{q,r} = u_{q-1,2^{-q}+1_{N-r-1}}$$

$$v_{q,r} = u_{q-1,r} - u_{q-1,2^{-q}+1_{N-r-1}}$$

$r = 0, 1, 2, \ldots 2^{-q}N - 1$ $q = 1, 2, 3, \ldots Q$ $u_{0,r} = d_r$ $u_{0,N-r} = d_{N-r}$ Q is the largest integer which is smaller than or equal to $-1 + {}^2\log N$;

(b) the iterative determination of a number of auxiliary sum elements by performing a number of further iteration steps on the difference elements obtained in the q-th iteration step in accordance with step a), while in the j-th further iteration step, the j-th order auxiliary sum elements $w_{q,j,m}$ are obtained for which it holds that:

$$w_{q,j,m} = w_{q,j-1,m} + w_{q,j-1,2^{-q-j}+1_{N-1-m}}$$

$m = 0, 1, 2, \ldots 2^{-q-j}N - 1$ $j = 1, 2, \ldots {}^2\log(2^{-q}N)$ $w_{q,0,m} = v_{q,m}$ $w_{q,0,2^{-q}N-1-m} = v_{q,2^{-q}N-1-m}$ (c) generating sub-product elements by multiplication of each of the two sum elements $u_{Q,o}$ and $u_{Q,1}$ obtained in step (a), as well as the difference elements $v_{q,r}$ and the auxiliary sum elements $w_{q,j,m}$ with the associated multiplication factors from a collection of multiplication factors, each multiplication factor being constituted by a linear combination of elements of the discrete cosine transform matrix; and (d) generating the product elements of the array of $1 \times N$ product elements $P_o$ to $P_{N-1}$ by making linear combinations of said sub-product elements.

2. A television transmission system as claimed in claim 1, in which the decoding station is provided with an inverse picture transform circuit adapted to perform a two-dimensional inverse discrete cosine transform on a received array of $N \times N$ basis picture weighting factors for generating a sub-picture of $N \times N$ pixels of a transmitted picture, said inverse picture transform circuit being constituted by a cascade arrangement of two one-dimensional inverse discrete cosine transformers which are each adapted to perform an inverse transform in which an array of $1 \times N$ product elements $p_o$ to $p_{N-1}$ applied to the transformer is converted into an array of $1 \times N$ data elements, characterized in that the inverse transform is the transposed version of the forward transform.

3. An encoding station for use in a television system as claimed in claim 1, which, for the purpose of transmission of a picture represented by a digital picture signal, is provided with means for partitioning said picture into sub-pictures of $N \times N$ pixels each, and a picture transform circuit which is adapted to perform a two-dimensional forward discrete cosine transform on each sub-picture for generating an array of $N \times N$ basis picture weighting factors, said picture transform circuit being constituted by a cascade arrangement of two one-dimensional forward discrete cosine transformers which are each adapted to perform a forward transform in which an array of $1 \times N$ data elements $d_o$ to $d_{N-1}$ applied to the transformer is transformed into an array of $1 \times N$ product elements $p_o$ to $p_{N-1}$, characterized in that the forward transform comprises the following steps:

(a) the iterative determination of two sum elements and $N-2$ difference elements by performing Q iteration steps, starting from the N data elements $d_o$ to $d_{N-1}$ in which in the q-th iteration step, the q-th order sum elements $u_{q,r}$ and the q-th order difference elements $v_{q,r}$ are obtained for which it holds that:

$$u_{q,r} = u_{q-1,r} + u_{q-1,2-q+1_{N-r-1}}$$

$$v_{q,r} = u_{q-1,r} - u_{q-1,2-q+1_{N-r-1}}$$

$r = 0, 1, 2, \ldots 2^{-q}N - 1$
$q = 1, 2, 3, \ldots Q$
$u_{o,r} = d_r$
$u_{o,N-r} = d_{N-r}$ Q is the largest integer which is smaller than or equal to $-1 + {}^2\log N$;

(b) the iterative determination of a number of auxiliary sum elements by performing a number of further iteration steps on the difference elements obtained in the q-th iteration step in accordance with step (a), while in the j-th further iteration step, the j-th order auxiliary sum elements $w_{q,j,m}$ are obtained for which it holds that:

$$w_{q,j,m} = w_{q,j-1,m} + w_{q,j-1,2-q-j+1_{N-1-m}}$$

$m = 0, 1, 2, \ldots 2^{-q-j}N - 1$
$j = 1, 2, \ldots {}^2\log(2^{-q}N)$
$w_{q,o,m} = v_{q,m}$
$w_{q,o,2-qN-1-m} = v_{q,2-qN-1-m}$ (c) generating sub-product elements by multiplication of each of the two sum elements $u_{Q,o}$ and $u_{Q,1}$ obtained in step (a), as well as the difference elements $v_{q,r}$ and the auxiliary sum elements $w_{q,j,m}$ with associated multiplication factors from a collection of multiplication factors, each multiplication factor being constituted by a linear combination of elements of the discrete cosine transform matrix; and (d) generating the product elements of the array of $1 \times N$ product elements $P_o$ to $P_{N-1}$ by making linear combinations of said sub-product elements.

4. A decoding station for use in a television system as claimed in claim 3, said decoding station being adapted to receive basis picture weighting factors which are transmitted by the encoding station, and being provided with an inverse picture transform circuit adapted to perform a two-dimensional inverse discrete cosine transform on a received array of $N \times N$ basis picture weighting factors for generating a sub-picture of $N \times N$ pixels of a transmitted picture, said inverse picture transform circuit being constituted by a cascade arrangement of two one-dimensional inverse discrete cosine transformers which are each adapted to perform an inverse transform in which an array of $1 \times N$ product elements $p_o$ to $p_{N-1}$ applied to the transformer is converted into an array of $1 \times N$ data elements, characterized in that the inverse transform is the transposed version of the forward transform.

* * * * *

UNITED STATES PATENT AND TRADEMARK OFFICE
CERTIFICATE OF CORRECTION

PATENT NO. : 4,831,440

DATED : May 16, 1989

INVENTOR(S) : STEPHANUS M.C. BORGERS ET AL

It is certified that error appears in the above-identified patent and that said Letters Patent is hereby corrected as shown below:

Title page;

In Section [75] Inventors should be

Stephanus M.C. Borgers
Egidius A.P. Habraken
Roberto Woudsma
all of Eindhoven

Signed and Sealed this

Twenty-sixth Day of December, 1989

Attest:

JEFFREY M. SAMUELS

*Attesting Officer*   *Acting Commissioner of Patents and Trademarks*